Oct. 27, 1970 N. LANE 3,536,330

TAPE-PLAYING APPARATUS

Filed Sept. 18, 1967 3 Sheets-Sheet 1

INVENTOR:
NORMAN LANE
BY Kurt Kelman
AGENT

INVENTOR:
NORMAN LANE
BY Kurt Kelman
AGENT

INVENTOR:
NORMAN LANE
BY Kurt Kelman
AGENT 3,536,330
TAPE-PLAYING APPARATUS
Norman Lane, Halesowen, England, assignor to BSR Limited, Old Hill, England, a British company
Filed Sept. 18, 1967, Ser. No. 668,566
Int. Cl. G11b *5/00*
U.S. Cl. 274—4 5 Claims

ABSTRACT OF THE DISCLOSURE

A tape recording/playback apparatus in which the transducer head is moved transversely of the tape by cam means and has an indicator member indicating the position of the head relative to the tape and hence the track being played.

BACKGROUND OF THE INVENTION

Field of the invention and description of the prior art

This invention relates to tape-playing and/or recording apparatus, hereinafter referred to as "of the type described," wherein a transducer head is moved transversely across the tape in a direction normal to the direction of travel thereof in order to operate on any one of a number of tracks of recording provided on the tape and particularly relates to the type of apparatus wherein the transducer head is mounted for movement in a direction transverse to the direction of travel of the tape, and operating means are provided to cause said movement.

The object of the present invention is to provide indicator means in such apparatus to indicate the position of the transducer head.

SUMMARY OF THE INVENTION

A multi-track tape apparatus including a body, a transducer head, means for moving the tape longitudinally past said transducer head, an arm pivotally mounted on said body, said transducer head being mounted on said arm, an indicator means to indicate the position of said head transversely of the tape, a cam movably mounted on the body, said cam means including two cams, one of said cams being engaged by a portion of said pivoted arm to cause pivotal movement of said arm to move said transducer head transversely of the tape, and the other of said cams being engaged by an indicator means operating member movable by said other cam to mechanically move said indicator means.

BRIEF DESCRIPTION OF THE DRAWINGS

A tape-playing apparatus embodying an indicator means according to the present invention will now be described in more detail by way of example with reference to the accompanying drawings wherein.

DESCRIPTION OF THE PREFERRED EMBODIMENT

Figure 1:
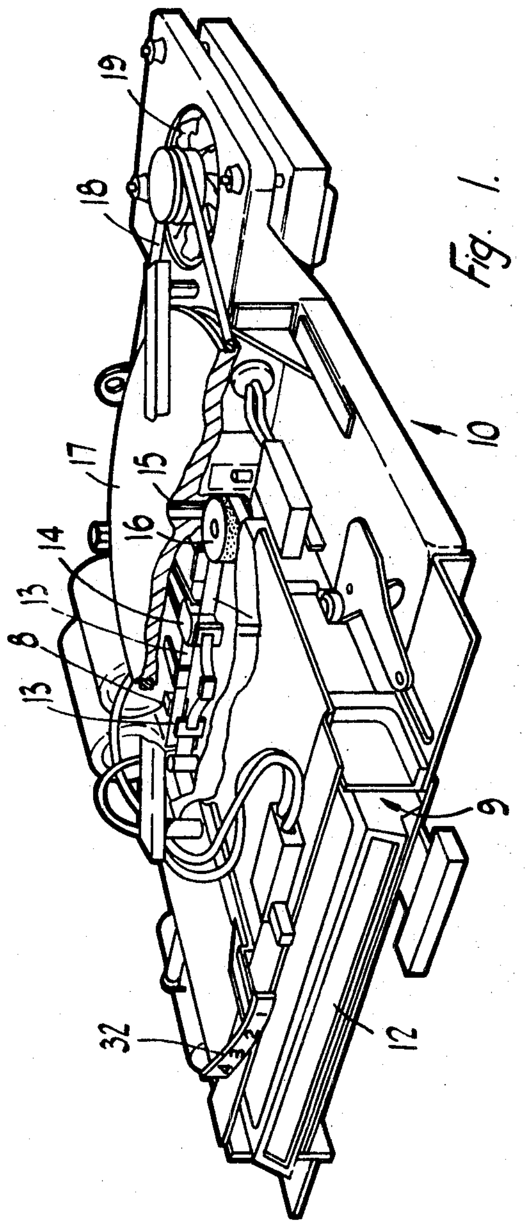
FIG. 1 is a perspective view of a tape-player embodying the invention with the outer casing removed and part cut away and taken from above, the front and to one side.
Figure 2:
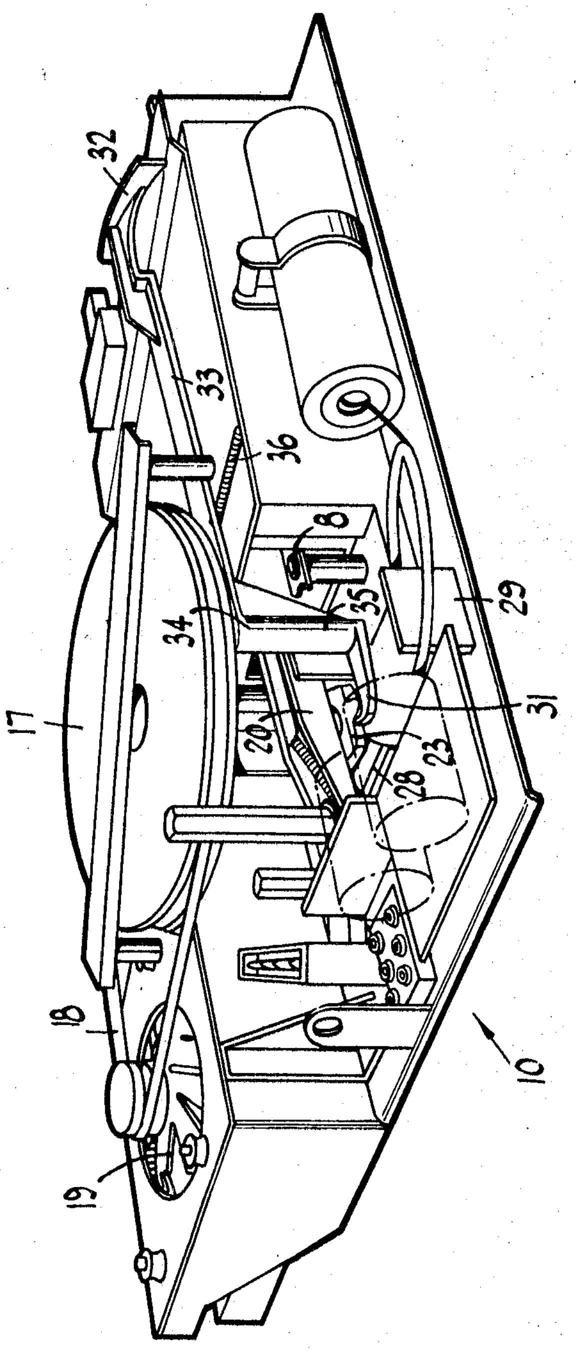
FIG. 2 is another perspective view of the tape-player of FIG. 1, taken from above, the rear, and to the other side.

This invention may be applied to any tape-playing apparatus or tape-recorder, but in this example a cartridge type of tape-playing apparatus will be described. The tape-player is illustrated generally at 10 in FIGS. 1 and 2 and comprises a pre-recorded tape 11 provided in a holder 12 generally known as a cartridge, in which the tape is coiled on a reel mechanism, not shown, transported past an opening 13 in the cartridge 12 and then recoiled within the cartridge. The cartridge 12 is arranged to be slidably inserted into a cartridge receiving cavity 9 in the apparatus 10 and suitable latch means are provided to hold the cartridge 12 in position and to resiliently urge it inwardly of the apparatus 10. When the cartridge 12 is inserted into the apparatus 10 the tape 11 makes contact with a magnetic sound reproducing head 14 as the tape is transported past the opening 13. The motion of the tape is derived from a capstan spindle 15 against which the outwardly presented face of the tape 11 is resiliently urged by means of a rotary pressure roller 16 which is engaged with the inwardly presented face of the tape, which pressure roller is mounted permanently within the cartridge 12. The capstan spindle 15 is rotatably mounted in the apparatus 10 on bearings, not shown, and is non-rotatably connected to a heavy flywheel on capstan 17 which is driven by a flexible band 18 from an electric motor 19.

The pre-recorded tape 11 is provided with a number of record tracks, for example, in the case of a monaural recording, four tracks, or in the case of a stereophonic recording, eight tracks arranged in four pairs. In order that any one of the tracks, in the case of a monaural recording, or pair of adjacent tracks in the case of a stereophonic recording, may be reproduced it is necessary for the reproducing head 14 to be moved transversely across the tape 11 in a direction perpendicular to the direction of travel of the tape. This is achieved, see FIGS. 2 to 5, by mounting the reproducing head 14 at one end of an arm 20 which is pivotally mounted at its other end about an axis 21 parallel to the direction of travel of the tape 11. For the purpose of convenience of description the direction of travel of the tape will be regarded as being in a horizontal plane and the tape as being moved from top to bottom in FIG. 3 with the plane of the tape being vertical and thus, pivotal movement of the arm 20 about its axis 21 results in a movement of the head 14 along an arcuate path but, due to the length of the arm 20 and the short distance moved, it may be regarded as a vertical movement of the head 14 transversely across the tape 11.

This vertical movement of the head 14 is achieved by engagement of a downwardly depending peg 22, provided on the head carrying arm 20, with a cam surface 23. The cam surface 23 is circular in plan view as shown in FIG. 3, and is provided with a number of portions at a varying height from a plane taken normal to the axis of rotation 24 of the cam which axis 24 of the cam is parallel to the direction of movement of the reproducing head 14.

Figures 3, 4, 5:
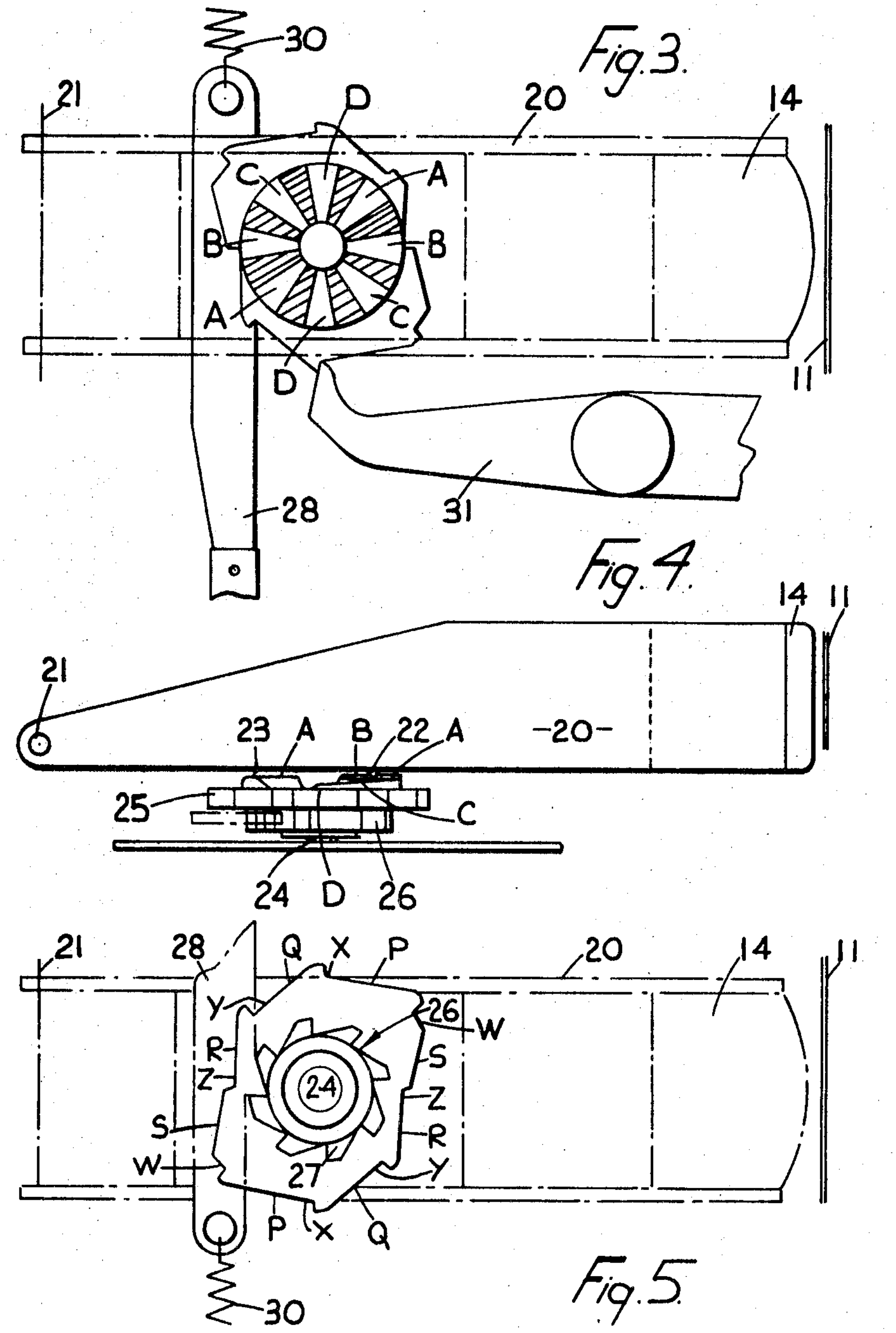
FIG. 3 is a detail plan view of the cam means of the tape-player of FIGS. 1 and 2 showing the reproducing head and other associated mechanism in ghost outline.
FIG. 4 is a side elevation of the cam means shown in FIG. 3.
FIG. 5 is an underneath plan view of the cam means shown in FIG. 3.

The shape of the cam surface 23 is clearly shown in FIGS. 3 and 4 of the accompanying drawings where it will be seen that the cam surface 23 is provided with two sets of four portions A, B, C, and D at differing heights from a plane normal to the axis of rotation. The portion A being the highest level and the portion D being the lowest level and there being inter-connecting portions, shaded, which enable the peg 22 provided on the head carrying arm 20 to be moved between the cam portions A, B, C, and D. These cam portions A, B, C, and D extend through 180° and then a second set of portions A, B, C, and D are provided through a further 180° so that over the complete cam surface two sets of cam portions are provided.

Beneath the cam surface 23 mentioned above there is provided a further cam surface 25 which forms a radial cam hereinafter to be described, and beneath this radial cam there is provided a ratchet wheel 26 having eight equi-spaced teeth 27 as shown in FIGS. 4 and 5. These teeth are acted upon by a click member 28 which is retracted in its longitudinal direction by means of a solenoid device 29 (when energised) thus stressing the spring 30 so that as the click member 28 is retracted by the spring 30 it engages with a tooth 27 and rotates the cam through 45° which corresponds to the angular distance between two adjacent cam portions A and B, or B and C, or C and D, etc. The spring 30 provides the operative movement of the click member 28 when the solenoid is de-energised. The solenoid is energised momentarily when a metal foil provided on the tape at the end of the programme passes a pair of contact members 8 and thus provides an electrical connection therebetween and thus completes electric circuit to the solenoid 29.

The radial cam mentioned above comprises two sets of four portions W, X, Y, and Z of progressively decreasing distance from the axis of rotation 24 of the cam. The portions W, X, Y, and Z being interconnected by portions P, Q, R, and S so that a cam follower 31, not shown in FIGS. 4 and 5 for clarity, connected to an indicator means to be described hereinafter, may be moved between the various cam portions W, X, Y, and Z as the cam rotates. It will, therefore, be seen that for each cam portion A, B, C, and D which causes the movement of the reproducing head transversely across the tape there is provided a cam surface W, X, Y, and Z for engagement with an indicator means so that the indicator means is moved to a different position as the head is moved to a different position.

It will be appreciated that the indicator means may take many different forms depending upon the shape of the external casing of the tape-playing apparatus and where it is desired to provide the visual indication. In this example, the visual indication will be described as being provided in a front vertical face of the tape-playing apparatus on the other side of the tape to the reproducing head and its associated cam means described above. The indicator means may comprise a window provided in the front face of the outer casing within which is displayed a movable pointer 32 having the figures 1, 2, 3, 4, marked thereon and an index mark fixed in the window. The pointer 32 is provided by an upstanding strip provided on one end of an arm 33 which is pivoted at its other end 34 to the apparatus 10 by means of an integrally formed boss 35 within which is a pivot pin, not shown, depending from the apparatus 10 is engaged. At the bottom end of the boss 35, the cam follower 31 is formed and a light tension spring 36 is arranged between the arm 33 and the apparatus 10 to gently urge the cam follower 31 into engagement with the radial cam surface 25.

Thus, when the cam follower 31 is engaged with the cam portion Z, which is the portion spaced nearest to the axis of rotation, the pointer 32 would be situated at one side of the window and as the cam is rotated the cam follower 31 is moved radially outwardly as it successively engages the portions Y, X, W and so the pointer 32 would move correspondingly across the window part and past the index mark. In the figures, the peg 22 is resting on the portion B of the cam surface 33 and the cam follower 31 is resting on the portion X, thus if portion A corresponds to track 1 then portion B will correspond to track 2 and so the pointer 32 will indicate the figure 2 in the window.

It will be appreciated that the cam portions W, X, Y, and Z of the cam surface 25 which correspond to the cam portions A, B, C, and D of the cam surface 23 may be inter-related in a number of different ways. For example, when the peg 22 on the head carrying arm 20 engages the portion A of the cam so that the head is raised to its highest position, which may be called track 1, the cam follower 31 of the indicator means may be arranged to engage the portion Z instead of the portion W, as in the present example, so that the pointer may be arranged to be at either side of the window. The arrangement which is achieved depends merely upon the relative angular relationship of the peg 22 and the cam follower 31, and of the two cam surfaces 25 and 23.

It should also be appreciated that the cam itself may be made in various ways so that any desired angular relationship between the portions W, X, Y, and Z with respect to the portions A, B, C, and D is obtained. The actual relationship being chosen depending on the direction or movement of the indicator pointer which is required to be achieved and also the positioning of the indicator since it will be realised that in some circumstances a quite complicated linkage may be required to transmit the movement from the cam to the position at which it is desired to position the visual indication and that in such linkages a reversal of the direction of movement of the various levers may be built in, so that it will be necessary to alter the inter-relation of the cam portions to compensate for this effect.

If desired, the radial cam surface may be so formed that it co-operates with the end of the cam follower 31 so that back rotation of the cam is prevented when the solenoid operated click member 28 is retracted.

What is claimed is:

1. A multi-track tape apparatus including a body, a transducer head, means for moving the tape longitudinally past said transducer head, an arm pivotally mounted on said body, said transducer head being mounted on said arm, an indicator means to indicate the position of said head transversely of the tape, a cam means movably mounted on the body, said cam means including two cams, one of said cams being engaged by a portion of said pivoted arm to cause pivotal movement of said arm to move said transducer head transversely of the tape, and the other of said cams being engaged by an indicator means operating member movable by said other cam to mechanically move said indicator means.

2. A tape apparatus according to claim 1, wherein said cams are mounted for rotation about a common axis, one of said cams having cam faces which extend different distances from a plane normal to said axis of rotation of the cam, and the other of said cams having portions spaced different distances from said axis of rotation.

3. A tape apparatus according to claim 2, wherein said axis of rotation of the cams is parallel to the direction of movement of the transducer head, and wherein said cams are non-rotatable relative to one another, and wherein said cam having cam faces which extend to different distances from a plane normal to said axis of rotation of the cam is engaged by said portion of said pivoted arm, and wherein said other cam having faces spaced different distances from said axis of rotation is engaged by said operating member.

4. A tape apparatus according to claim 3, wherein said indicator means comprises a rigid elongated element pivotally mounted on said body, one end of said element constituting said operating member and being engaged with said other cam, and the other end of said element constituting a visual indicator, to indicate the position of said transducer head transversely of the tape.

5. Tape apparatus according to claim 4, wherein said other cam is formed so that other cam co-operates with said operating member to prevent rotation of said cam in one direction.

References Cited

UNITED STATES PATENTS

| | | |
|---|---|---|
| 2,908,769 | 10/1959 | Fonda. |
| 3,279,799 | 10/1966 | Proctor. |
| 3,388,911 | 6/1968 | Wilson et al. |
| 3,437,762 | 4/1969 | Lear et al. |

FOREIGN PATENTS

| | | |
|---|---|---|
| 1,109,216 | 6/1961 | Germany. |

HARRY N. HAROIAN, Primary Examiner